United States Patent
Kawana et al.

(10) Patent No.: US 9,477,218 B2
(45) Date of Patent: Oct. 25, 2016

(54) NUMERICAL CONTROL METHOD AND NUMERICAL CONTROL DEVICE OF MACHINE TOOL

(75) Inventors: Akira Kawana, Aiko-gun (JP); Norio Mori, Aiko-gun (JP); Mitsunari Oda, Aiko-gun (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 650 days.

(21) Appl. No.: 13/823,663

(22) PCT Filed: Oct. 26, 2011

(86) PCT No.: PCT/JP2011/074698
§ 371 (c)(1),
(2), (4) Date: Mar. 14, 2013

(87) PCT Pub. No.: WO2012/057219
PCT Pub. Date: May 3, 2012

(65) Prior Publication Data
US 2013/0173045 A1    Jul. 4, 2013

(30) Foreign Application Priority Data

Oct. 27, 2010   (JP) .................................. 2010-241388

(51) Int. Cl.
*G05B 19/18* (2006.01)
*G06F 19/00* (2011.01)
(Continued)

(52) U.S. Cl.
CPC ........... *G05B 19/182* (2013.01); *G05B 19/404* (2013.01); *G05B 2219/41078* (2013.01);
(Continued)

(58) Field of Classification Search
USPC .................... 700/37, 28, 186–188, 173–177, 700/159–162; 318/632, 561, 569
See application file for complete search history.

(56) References Cited

U.S. PATENT DOCUMENTS

2001/0012972 A1* 8/2001 Matsumoto ........ G05B 19/4166
700/160
2005/0119784 A1* 6/2005 Suzuki ............... G05B 19/4163
700/188

(Continued)

FOREIGN PATENT DOCUMENTS

JP    6-297058    10/1994
JP    7-249564    9/1995

(Continued)

OTHER PUBLICATIONS

International Search Report mailed Jan. 24, 2012, directed to International Application No. PCT/JP2011/074698; 2 pages.

*Primary Examiner* — Mohammad Ali
*Assistant Examiner* — Md Azad
(74) *Attorney, Agent, or Firm* — Morrison & Foerster LLP

(57) ABSTRACT

A numerical control device which controls a feed axis of a machine tool has a storage unit which divides a range of movement of the feed axis into a plurality of regions and stores a plurality of control parameters corresponding to the divided plurality of regions in advance, a position detection unit which detects a position of a feed axis at the time of machining a workpiece, a parameter selection unit which reads out control parameters corresponding to a divided region to which the detected feed axis position at the time of machining a workpiece belongs, and a servo control unit which controls the feed axis using the read control parameters. Due to this, it is possible to provide a numerical control method of a machine tool which realizes stable machining precision without regard as to the feed axis position and a numerical control device which conducts that method.

4 Claims, 8 Drawing Sheets

(51) Int. Cl.
*G05B 13/00* (2006.01)
*G05D 23/275* (2006.01)
*G05B 19/404* (2006.01)

(52) U.S. Cl.
CPC ........... *G05B2219/41083* (2013.01); *G05B 2219/41155* (2013.01); *G05B 2219/42039* (2013.01); *G05B 2219/49182* (2013.01)

(56) References Cited

U.S. PATENT DOCUMENTS

2010/0207567 A1* 8/2010 Mori ............... B23Q 17/22 318/632
2011/0166693 A1* 7/2011 Nishibashi ......... G05B 19/4103 700/187
2011/0190925 A1* 8/2011 Fujishima .......... G05B 19/4155 700/173

FOREIGN PATENT DOCUMENTS

| | | |
|---|---|---|
| JP | 11-231914 | 8/1999 |
| JP | 11-282518 | 10/1999 |
| JP | 2001-34315 | 2/2001 |
| JP | 2002-239872 | 8/2002 |
| JP | 2004-234205 | 8/2004 |
| JP | 2006-301843 | 11/2006 |
| JP | 2008-41011 | 2/2008 |

* cited by examiner

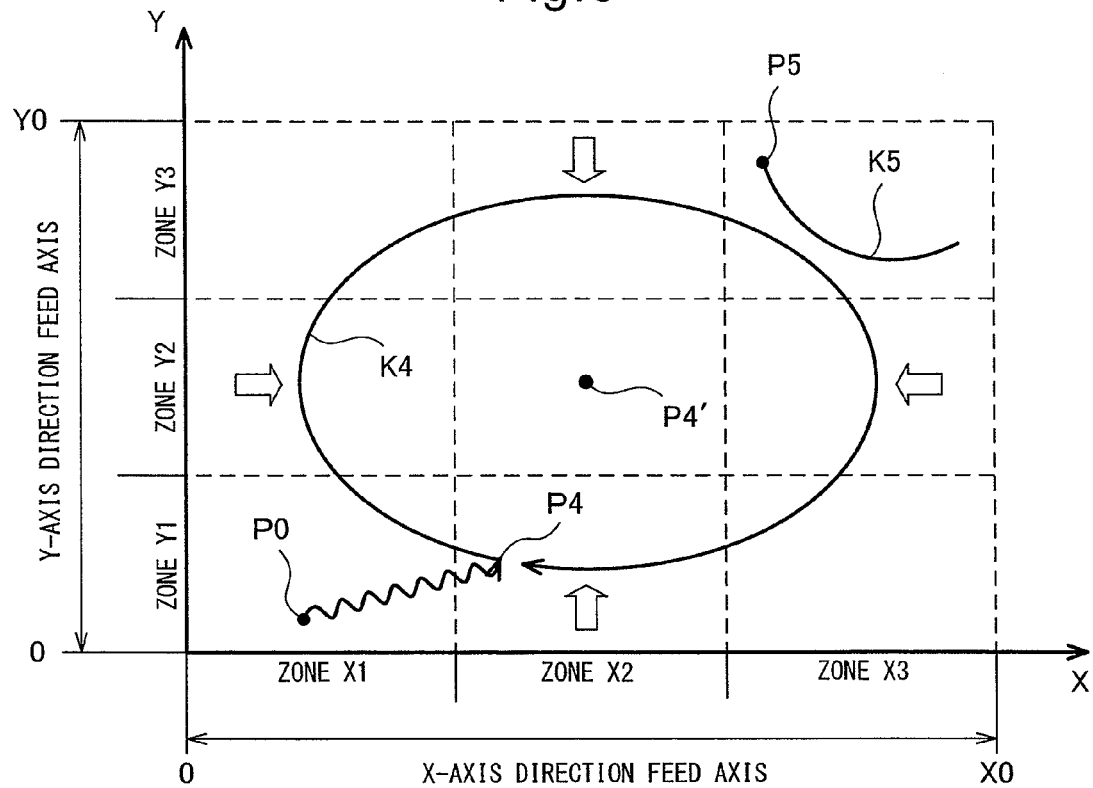
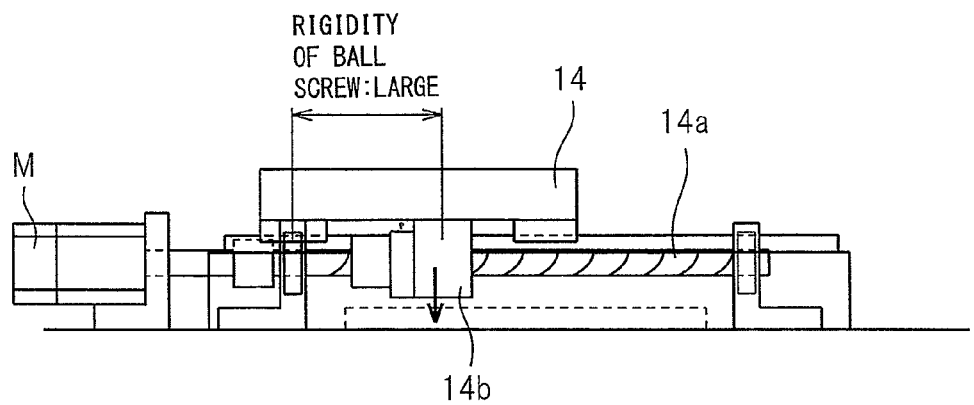

STICK MOTION: SMALL

NUMERICAL CONTROL METHOD AND NUMERICAL CONTROL DEVICE OF MACHINE TOOL

REFERENCE TO RELATED APPLICATIONS

This application is the national stage application under 35 USC 371 of International Application No. PCT/JP2011/074698, filed Oct. 26, 2011, which claims priority from Japanese Patent Application No. 2010-241388, filed Oct. 27, 2010, the entire contents of which are incorporated herein by reference.

TECHNICAL FIELD OF THE INVENTION

The present invention relates to a numerical control method which controls a feed axis of a machine tool and a numerical control device which conducts that method.

BACKGROUND OF THE INVENTION

A machine tool includes at least one feed mechanism for making a workpiece and a tool move relative to each other. The motor for driving the feed mechanism is controlled by a numerical control device. When a feed direction of the workpiece or tool is reversed by the feed mechanism, the direction of action of frictional force between the relatively moving parts included in the feed mechanism (for example, the feed screw and nut) reverses, so the phenomenon arises of the operation of the feed mechanism being delayed for an instant. For example, when using two perpendicularly intersecting linear feed mechanisms to make a workpiece or tool move in an arc, this phenomenon of delay generally causes the unpreferable position error called "stick motion".

In relation to this, there is known a numerical control device which is designed to update backlash correction command values in accordance with the elapsed time from the occurrence of reversal if the feed direction of the table carrying the workpiece reverses, to add the correction command values to the position command values, to use the results of addition as the basis to control operation of the servo motors which drive the table, to precisely compensate for elastic deformation which occurs when the feed direction reverses, and to suppress occurrence of stick motion (see PLT 1). Further, PLT 2 discloses to change the Y-axis servo parameters of speed loop gain and position loop gain in accordance with the X-axis position.

PLT 1: Japanese Unexamined Patent Publication No. 2004-234205A

PLT 2: Japanese Unexamined Patent Publication No. 6-297058A

SUMMARY OF THE INVENTION

Technical Problem

In this regard, a feed mechanism has a predetermined path of movement for the feed direction. A position on this path will hereinafter be referred to as a "feed axis position". For example, when the feed mechanism is comprised of a feed screw and nut, the position of the nut with respect to the feed screw corresponds to the "feed axis position". Depending on the feed axis position, the rigidity of the feed screw and the friction coefficient between the feed screw and nut and other mechanical properties at that position strictly speaking differ. However, in the past, the difference in the rigidity of the members of the feed mechanism and the friction coefficient etc. due to the feed axis position was not considered in numerical control of a machine tool.

The present invention provides, in one aspect, a numerical control method of a machine tool which realizes stable machining precision without regard as to the feed axis position and a numerical control device which conducts that method.

Solution to Problem

According to the aspect of the invention as set forth in claim 1, there is provided a numerical control method which controls a feed axis of a machine tool, the numerical control method of a machine tool comprising steps of dividing a range of movement of the feed axis into a plurality of regions and storing in advance a plurality of control parameters corresponding to the divided plurality of regions, analyzing a machining path from a machining program of the machine tool, reading out control parameters corresponding to a divided region determined in accordance with the machining path from the stored plurality of control parameters, and controlling the feed axis using the read control parameters.

Further, according to the aspect of the invention as set forth in claim 2, there is provided the aspect of the invention as set forth in claim 1, wherein the control parameters are read out while the feed axis is moving toward a machining start position and are set to the control parameters immediately after reaching the machining start position.

Further, according to the aspect of the invention as set forth in claim 3, there is provided the aspect of the invention as set forth in claim 1, wherein, when the machining path extends across a plurality of regions, control parameters corresponding to the region in which the machining path is included the longest are read out.

Further, according to the aspect of the invention as set forth in claim 4, there is provided the aspect of the invention as set forth in claim 1, wherein, when the machining path is an arc, control parameters corresponding to the region including a center of the arc are read out. Further, according to the aspect of the invention as set forth in claim 5, there is provided the aspect of the invention as set forth in claim 1, wherein the control parameters include at least one of an acceleration/deceleration time constant, feedback gain, feed forward gain, stick motion correction parameter, and filter constant of the feed axis.

Further, according to the aspect of the invention as set forth in claim 6, there is provided a numerical control device which controls a feed axis of a machine tool, comprising a storage unit which divides a range of movement of the feed axis into a plurality of regions and stores a plurality of control parameters corresponding to the divided plurality of regions, an analysis unit which analyzes a machining path from a machining program of the machine tool, a parameter selection unit which reads out control parameters corresponding to a divided region determined in accordance with the machining path from the stored plurality of control parameters, and a servo control unit which controls the feed axis using the read control parameters.

Advantageous Effects of Invention

According to the aspects of the invention as set forth in the claims, by dividing the range of movement of the feed axis into a plurality of regions and using a plurality of control parameters which correspond to the divided plurality of regions to control the feed axis, the common effect is exhibited of absorbing differences in the rigidity of the members of the feed mechanism and the friction coefficient etc. due to the feed axis position and realizing stable machining precision without regard as to the feed axis position. Further, the machining program is used as the basis to determine the control parameters in advance, so the effect is exhibited of enabling stable control parameters to be set.

BRIEF DESCRIPTION OF THE DRAWINGS

FIG. 6 is another view which shows divided regions and the feed axis positions.

FIG. 7A is a first side view of a machine tool.

DETAILED DESCRIPTION OF THE INVENTION

Below, referring to the attached drawings, embodiments of the present invention will be explained. In the following figures, similar members will be assigned similar reference notations. To facilitate understanding, these figures are suitably changed in scale.

Figure 1:
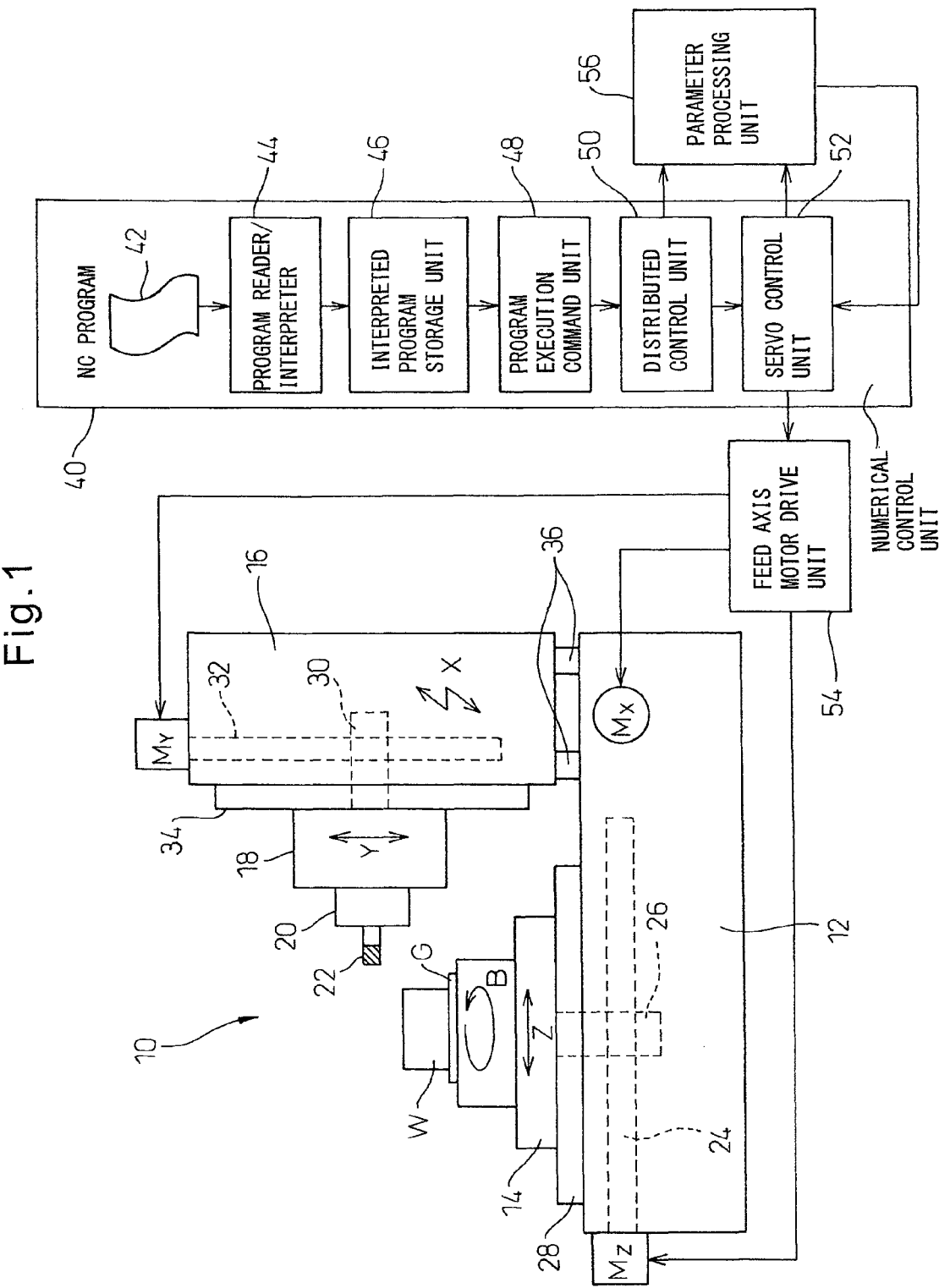
FIG. 1 is a schematic view of a numerical control machine tool according to one aspect of the present invention.

FIG. 1 is a schematic view of a numerical control machine tool 10 according to one aspect of the present invention. In FIG. 1, the numerical control machine tool 10 is a so-called horizontal machining center which is provided with a bed 12 which is placed on the floor of a factory etc. On the top surface of the bed 12, Z-axis guide rails 28 are laid in a horizontal Z-axis direction (left-right direction in FIG. 1). At the Z-axis guide rails 28, a table 14 for fastening a workpiece W through a workpiece jig G is slidably attached. FIG. 1 shows an example of fastening an NC rotary table able to rotate in a B-axis direction on the table 14 and placing a workpiece W on top of that, but a workpiece W may be directly placed on the table 14 without interposition of an NC rotary table.

On the top surface of the bed 12, further, X-axis guide rails 36 are laid in an X-axis direction which is perpendicular to the Z-axis and horizontal (direction vertical to paper surface in FIG. 1). At the X-axis guide rails 36, a column 16 is slidably attached. At the front surface of the column 16 facing the workpiece W, Y-axis guide rails 34 are laid in a Y-axis direction, which is perpendicular to the X-axis and Z-axis (in FIG. 1, top-bottom direction). At the Y-axis guide rails 34, a spindle head 18 which rotatably supports a spindle 20 is slidably attached.

Inside the bed 12, at the bottom side of the table 14, a Z-axis feed screw 24 is laid in the Z-axis direction. At the bottom surface of the table 14, a nut 26 is fastened which engages with the Z-axis feed screw 24. At one end of the Z-axis feed screw 24, a Z-axis feed servo motor Mz is connected. By driving the Z-axis feed servo motor Mz to make the Z-axis feed screw 24 turn, the table 14 moves along the Z-axis guide rails 28. Similarly, inside the bed 12, at the bottom side of the column 16, an X-axis feed screw (not shown) is laid in the X-axis direction. At the bottom surface of the column 16, a nut (not shown) is fastened which engages with the X-axis feed screw.

At one end of the X-axis feed screw, an X-axis feed servo motor Mx is connected. By driving the X-axis feed servo motor Mx to make the X-axis feed screw turn, the column 16 moves along the X-axis guide rails 36. Further, inside the column 16, a Y-axis feed screw 32 is laid in the Y-axis direction. At the back surface of the spindle head 18, a nut 30 is fastened which engages with the Y-axis feed screw 32. At the top end of the Y-axis feed screw 32, a Y-axis feed servo motor My is connected. By driving the Y-axis feed servo motor My to make the Y-axis feed screw 32 turn, the spindle head 18 moves along the Y-axis guide rail 34.

At the tip of the spindle 20, a tool 22, for example, an end mill, is attached. By making the tool 22 rotate while making the column 16, spindle head 18, and table 14 operate in the X-axis, Y-axis, and Z-axis directions, respectively, the workpiece W which is fastened to the table 14 is cut to a desired shape. When the NC rotary table is fastened, the numerical control machine tool 10 can be said to be a four-axis numerical control machine tool which has a B-axis.

The numerical control machine tool 10 is provided with a numerical control unit 40 which controls the column 16, spindle head 18, and X-axis, Y-axis, and Z-axis feed servo motors Mx, My, and Mz which make the table 14 move in the X-axis, Y-axis, and Z-axis directions. When having an NC rotary table, a B-axis feed servo motor (not shown) is provided.

The numerical control unit 40 includes a program reader/interpreter 44 which reads the NC program 42 and interprets it, an interpreted program storage unit 46 which temporarily stores the interpreted program, a program execution command unit 48 which suitably pulls out a program from the interpreted program storage unit 46 and issues execution program data, a distributed control unit 50 which uses execution program data from the program execution command unit 48 as the basis to issue position command values, speed command values, and acceleration command values to the X-axis, Y-axis, and Z-axis, respectively, and a servo controller 52 which uses the position command values, speed command values, and acceleration command values from the distributed control unit 50 and the later explained feedback signal as the basis to issue torque command values or current command values to a feed axis motor drive unit 54. Note that, for the B-axis as well, in the same way, the distributed control unit 50 issues position command values, angular speed command values, angular acceleration command values, etc. to the B-axis.

The feed axis motor drive unit 54 uses the torque command values or current command values from the servo controller 52 as the basis to output current and drive the X-axis, Y-axis, and Z-axis feed axis motors (servo motors) Mx, My, and Mz. Further, in the present embodiment, a parameter processing control unit 56 is provided which corrects the torque command values or current command values from the servo controller 52 to the feed axis motor drive unit 54.

Figure 2:
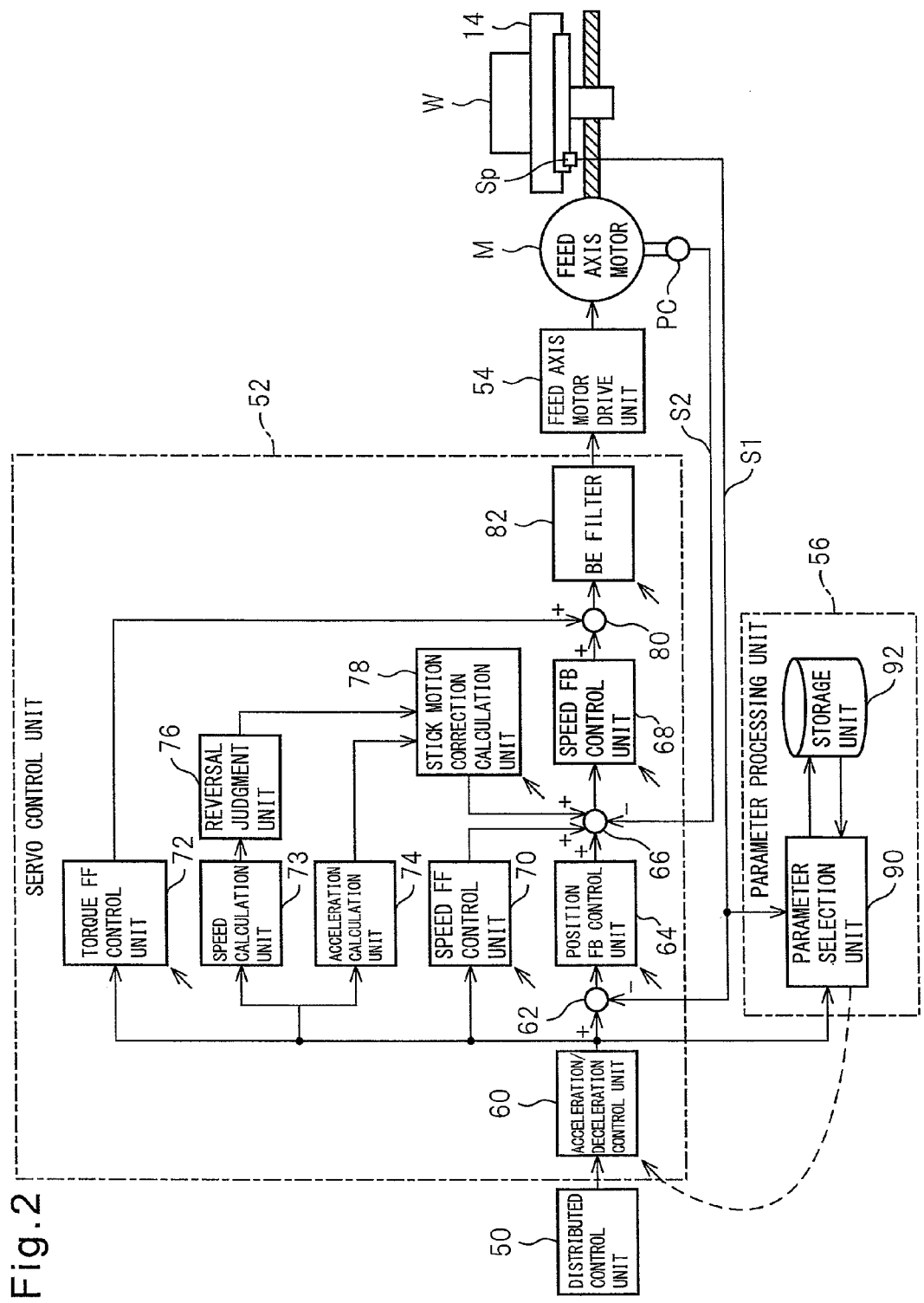
FIG. 2 is a block diagram which shows a configuration for controlling a Z-axis direction feed mechanism of the numerical control machine tool which is shown in FIG. 1.

FIG. 2 is a block diagram which shows the configuration for controlling the Z-axis direction feed mechanism of the numerical control machine tool 10 which is shown in FIG. 1. In FIG. 2, the components which correspond to FIG. 1 are indicated by the same reference notations.

The servo control unit 52 includes a subtractor 62 which subtracts a position feedback signal S1 of a Z-axis direction digital linear scale or other position detector Sp from a position command value from a distributed control unit 50 through an acceleration/deceleration control unit 60 for smooth acceleration/deceleration, a position feedback control unit 64 which uses the output of the subtractor 62 as the basis for feedback control of the position, a subtractor 66 which subtracts a speed feedback signal S2 from a pulse coder PC provided at the feed axis motor M from a speed command which is output from the position feedback control unit 64, and a speed feedback control unit 68 which uses the output of the subtractor 66 as the basis for feedback control of the speed.

On the other hand, the torque command values, speed command values, and position command values from the distributed control unit 50 through the acceleration/deceleration control unit 60 are sent to a speed feed forward control unit 70, torque feed forward control unit 72, speed calculation unit 73, and acceleration calculation unit 74. The output values from the speed feed forward control unit 70 are added at the subtractor 66. Further, the speed value which is calculated at the speed calculation unit 73 is used as the basis to judge if the direction of the speed reverses at a next reversal judgment unit 76, that is, if the feed direction reverses. If it is judged at the reversal judgment unit 76 that the speed reverses, a stick motion correction calculation unit 78 calculates a stick motion correction value for suppressing stick motion based on the acceleration which is calculated by the acceleration calculation unit 74, and the stick motion correction value is added at the subtractor 66. The output value from the torque feed forward control unit 72 and the output value from the speed feedback control unit 68 are added at an adder 80 and the result supplied to a band elimination filter 82. At the band elimination filter 82, a filter constant is used as the basis to attenuate the signal of the frequency in a predetermined frequency range and pass signals of other frequencies, then supply them to the feed axis motor drive unit 54.

The parameter processing unit 56 includes a parameter selection unit 90 and a storage unit 92. The parameter selection unit 90, as explained later, has the function of reading the set of the suitable control parameters from the storage unit 92 and using the read values as the basis to change the various types of control parameters. The "control parameters" specifically are the acceleration/deceleration parameter, that is, the time constant, at the acceleration/deceleration control unit 60, the feedback gain at the position feedback control unit 64 and speed feedback control unit 68, the feed forward gain at the speed feed forward control unit 70 and torque feed forward control unit 72, the parameter for stick motion correction at the stick motion correction calculation unit 78, the filter constant at the band elimination filter 82, and other vibration suppressing control parameters for motors etc. Note that, the acceleration calculation unit 74, reversal judgment unit 76, and stick motion correction calculation unit 78 may also be included in the parameter processing control unit 56. Of course, the parameter processing unit 56 performs other processing as well.

Note that, in the X-axis direction feed mechanism, Y-axis direction feed mechanism, and B-axis direction feed mechanism as well, in the same way as above, position detectors, pulse coders, etc. are provided at the respective feed axis motors etc.

In this regard, as explained above, depending on the feed axis position, the rigidity of the feed screw and the friction coefficient between the feed screw and nut and other mechanical properties at that position strictly speaking differ. According to the present invention, it is possible to stabilize the machining precision without regard as to the feed axis position. Below, the method for that will be explained.

Figure 3:
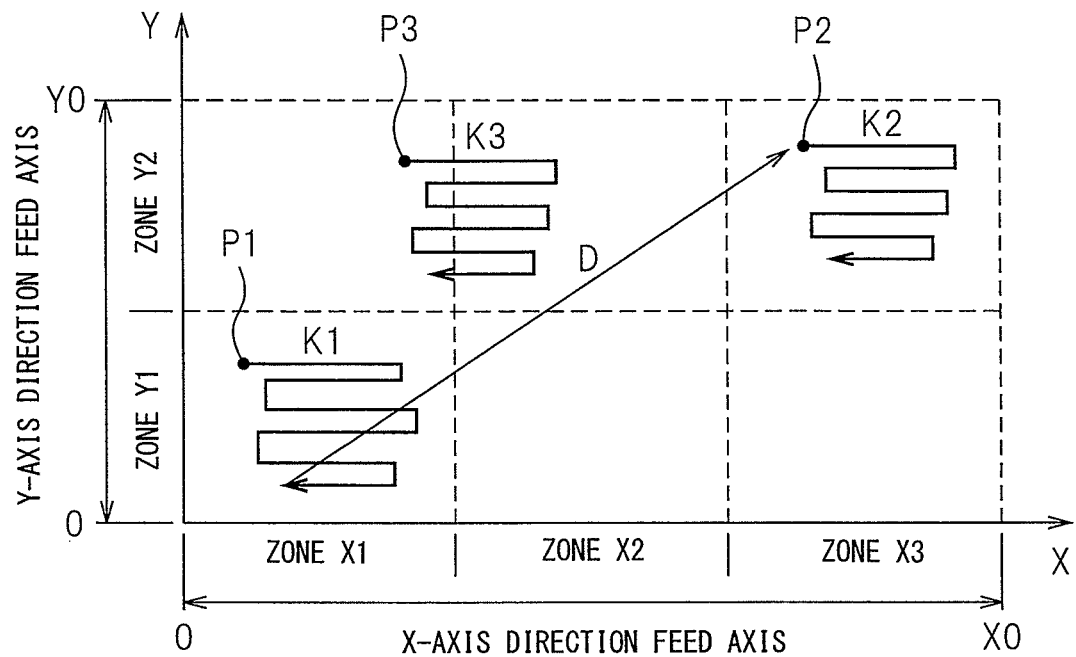
FIG. 3 is a view which shows divided regions and the feed axis positions in the numerical control machine tool which is shown in FIG. 1.

FIG. 3 is a view which shows the divided regions and the feed axis positions in the numerical control machine tool which is shown in FIG. 1. If the range of movement of the X-axis direction feed axis, that is, in FIG. 1, the range by which a nut screwed with the not shown X-axis feed screw can move, explained further, the range over which the column 16 can move with respect to the X-axis guide rails 36, is 0 to X0, this range is equally divided into the three regions of the zones X1, X2, and X3. Similarly, if the range of movement of the Y-axis direction feed axis, that is, in FIG. 1, the range by which a nut screwed with the not 30 shown Y-axis feed screw 32 can move, explained further, the range over which the spindle head 18 can move with respect to the Y-axis guide rails 34, is 0 to Y0, this range is equally divided into the two regions of the zones Y1 and Y2.

Furthermore, FIG. 3 also shows the path of the tool 22, that is, the planned machining line. First, at the X-axis direction zone X1 and Y-axis direction zone Y1, the workpiece is machined by the machining operation K1 using P1 as the machining start position. Then, after movement not accompanied with a machining operation, that is, fast feed movement D, is performed, then a machining operation K2 is performed from the machining start position P2.

To stabilize the machining precision at the time of these machining operations, at each of the divided regions, the optimum values of the time constant and feedback gain and various other types of control parameters are found in advance by experiment and calculation and stored in the storage unit 92. At the time of machining, the parameter selection unit 90 reads the control parameters corresponding to the region to be machined, that is, the control parameters corresponding to the divided region to which the feed axis position at the time of machining the workpiece belongs, from the storage unit 92 and changes or updates the control parameters at the control unit or calculation unit. The control units or calculation units of the servo control unit are controlled by servo control using the read control parameters for machining.

In relation to this, as the control parameters, the feedback gain of the position feedback control unit 64 is explained as an example. In the X-axis direction feed axis zones X1, X2, and X3, the optimum feedback gains which are stored in the storage unit 92 are designated as the feedback gains FgX1, FgX2, and FgX3. Further, at the Y-axis direction feed axis zones Y1 and Y2, the optimum feedback gains which are stored in the storage unit 92 are respectively designated as the feedback gains FgY1 and FgY2.

The region in which the first machining K1 is performed is the X-axis direction feed axis zone X1 and Y-axis direction feed axis zone Y1, so due to the parameter selection unit 90, at the X-axis direction feed mechanism, the current feedback gain is changed to the feedback gain FgX1 which is read from the storage unit 92, and, at the Y-axis direction feed mechanism, the current feedback gain is changed to the feedback gain FgY1 which is read from the storage unit 92 so as to perform the machining operation K1. Further, the region where the next machining operation K2 is performed is the X-axis direction feed axis zone X3 and Y-axis direction feed axis zone Y2, so due to the parameter selection unit 90, at the X-axis direction feed mechanism, the feedback gain FgX1 at the time of the end of the machining operation K1 is changed to the feedback gain FgX3 which is read from the storage unit 92, and, at the Y-axis direction feed mechanism, the current feedback gain FgY1 is changed to the feedback gain FgY2 which is read from the storage unit 92.

When the region which is machined extends across several regions, for example, in the case of the machining operation K3, which region of values to apply can, for example, be determined by the machining start position. In the case of machining operation K3, the machining start position P3 is present at the X-axis direction zone X1 and Y-axis direction zone Y2, so the control parameters corresponding to that region is applied. Further, the tool path information which was obtained from the interpreted program storage unit 46 may be used as the basis to predict the region with the longest distance machined and apply the control parameters corresponding to the same. In the case of the machining operation K3, the region with the longest machining distance is the X-axis direction zone X2 and Y-axis direction zone Y2, so control parameters which correspond to the region may also be applied. Further, control parameters which correspond to the region at the end position of the machining operation may also be applied. Furthermore, insofar as not having an effect on the machining precision, after transition of the region being machined, it is also possible to apply in real time the control parameters which correspond to the region after transition.

Note that, the region to which the parameter selection unit 90 applies the control parameters is specified based on the position command value or position feedback signal S1 from the distributed control unit 50 through the acceleration/deceleration control unit 60. Therefore, for example, the position command values from the distributed control unit 50 may be used as the basis to predict in advance and apply control parameters corresponding to the region to which the next machining start position P2 belongs during the fast feed movement D.

According to the above embodiment, as the control parameters, the feedback gain in the position feedback control unit 64 was explained as an example, but the time constant in the acceleration/deceleration control unit 60, the feedback grain in the speed feedback control unit 68, the feed forward gain in the speed feed forward control unit 70 and the torque feed forward control unit 72, the filter constant in the band elimination filter 82, the vibration suppressing control parameters in the drive motor, and other control parameters may be similarly applied. In FIG. 2, the commands shown by the broken line from the parameter selection unit 90 to the acceleration/deceleration control unit 60 are drawn. Similar commands are also sent to the position feedback control unit 64, speed feed forward control unit 70, torque feed forward control unit 72, stick motion correction calculation unit 78, and band elimination filter 82, but illustration is omitted.

Regarding the parameters for stick motion correction of the stick motion correction calculation unit 78, it is necessary to judge each time if it is necessary to change the control parameters, so this will be explained with reference to FIG. 4. Except for the need for judgment, the method applied when changing the control parameters etc. are similar to that of the feedback gain of the position feedback control unit 64.

Figure 4:
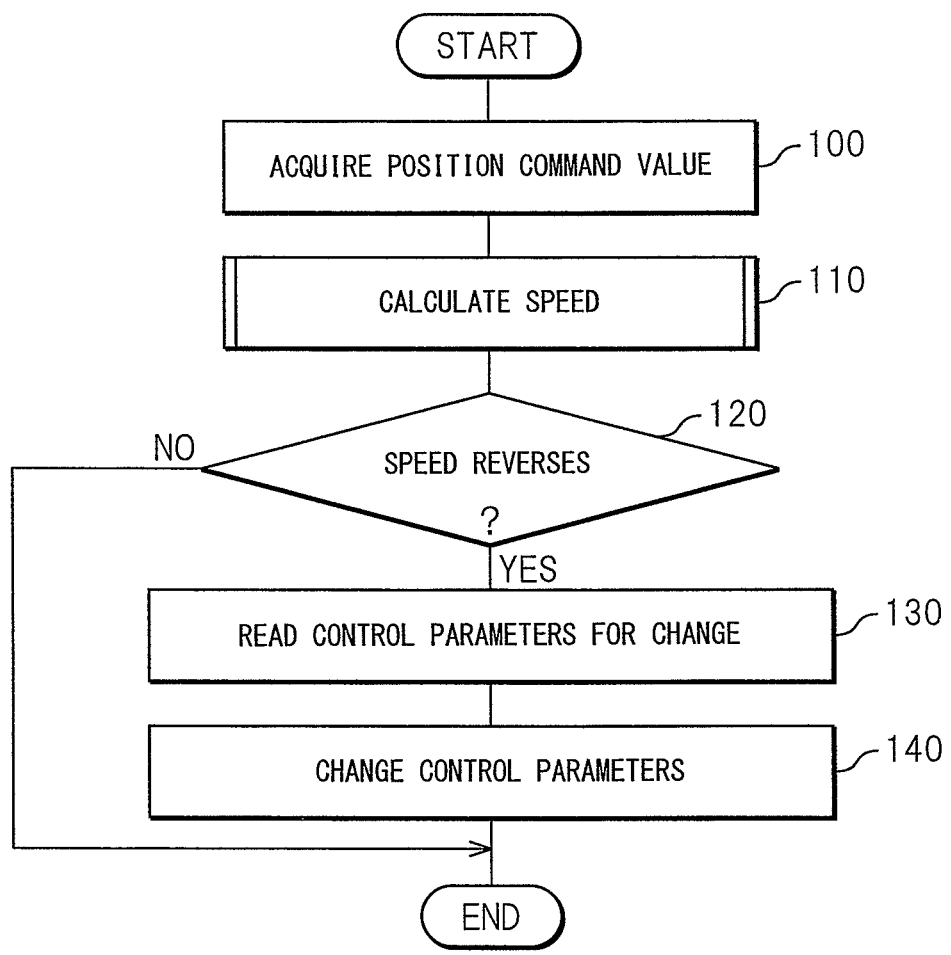
FIG. 4 is a flow chart of judgment processing which judges if it is necessary to change parameters for stick motion correction of a stick motion correction calculation unit.

FIG. 4 is a flow chart of judgment processing which judges if it is necessary to change the parameters for stick motion correction of the stick motion correction calculation unit 78. Referring to FIG. 4, first, at step 100, a position command value is acquired from the distributed control unit 50 through the acceleration/deceleration control unit 60, then the routine proceeds to step 110. At step 110, the position command value which is obtained at step 100 is used as the basis to calculate the speed, then the routine proceeds to step 120. At step 120, the speed which was calculated at step 110 is used as the basis to judge if the speed has reversed, that is, if the sign has reversed, explained further, if the feed direction has reversed. When, at step 120, the speed does not reverse, the routine is ended. On the contrary, when, at step 120, the speed reverses, the routine proceeds to step 130. Then, at step 130, the parameter selection unit 90 is used to read out from the storage unit 92 the control parameters of the parameters for stick motion correction corresponding to the region to which the feed axis position belongs, then the routine proceeds to step 140. At step 140, the control parameters which were read at step 130 are used as the basis to change the control parameters and the routine is ended.

In the aspect of the present invention explained above, the regions were equally divided, but they may also be not equal. In other words, it is also possible that they differ depending on the location such as being finely divided in places where the fluctuation of the rigidity, friction coefficient, and other mechanical properties with respect to the feed axis position is large and being divided large at places where the fluctuation is small.

Further, in the above-mentioned aspect of the present invention, the storage unit 92 stores independent control parameters for the different feed axis directions. In other words, in the above aspect, the control parameters were the total five of the three in the X-axis direction feed axis and the two in the Y-direction feed axis. Therefore, regardless of the Y-axis direction region, the control parameters corresponding to the X-axis direction region were applied to the X-axis direction feed mechanism. However, control parameters linking the X-axis direction and Y-axis direction may also be stored. That is, in the case of the X-axis direction feed axis zone X1 and Y-axis direction feed axis zone Y1, it is possible to make the feedback gain FgX1Y1, while in the case of the X-axis direction feed axis zone X1 and Y-axis direction feed axis zone Y2, it is possible to make the feedback gain FgX1Y2. In this way, it is possible to store six control parameters, that is, the three in the X-axis direction feed axis multiplied with the two in the Y-direction feed axis. By using control parameters which link the X-axis direction and Y-axis direction, it becomes possible to realize more stable machining precision.

Further, in the above-mentioned aspect of the present invention, there were two feed axes, that is, the X-axis direction and Y-axis direction, but there may also be one feed axis or three or more.

Figure 5:
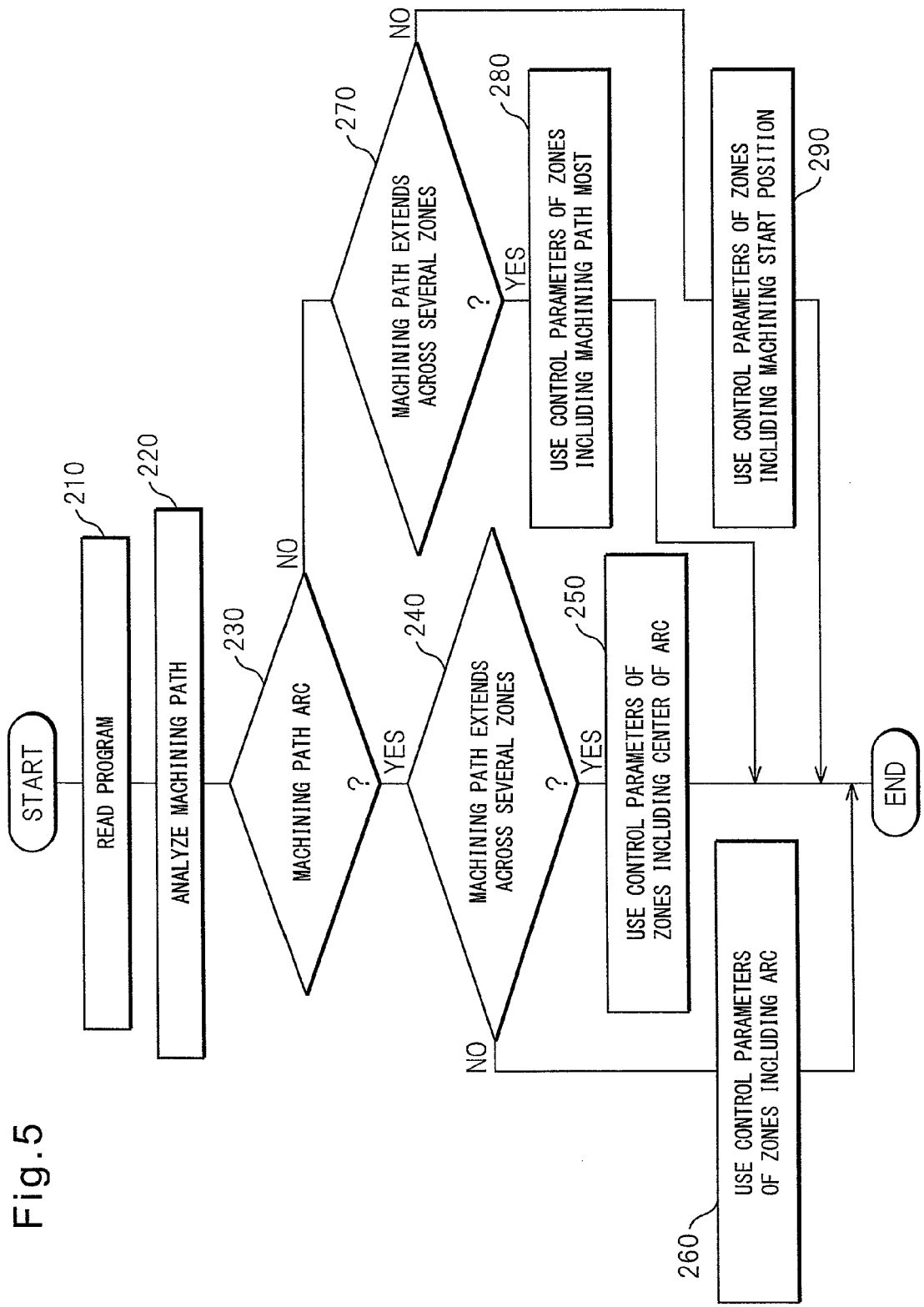
FIG. 5 is another flow chart of judgment processing which judges if it is necessary to change the parameters for stick motion correction of a stick motion correction calculation unit.

FIG. 5 is another flow chart of judgment processing which judges if it is necessary to change the parameters for stick motion correction of the stick motion correction calculation unit. As can be seen from FIG. 5, it is also possible to determine the control parameters to be changed before actually operating the machine tool. At step 210 of FIG. 5, the program reader/interpreter 44 reads the NC program 42, then uses the NC program 42 which is read at step 220 as the basis to analyze the machining path. That is, the program reader/interpreter 44 performs the role as an analysis unit which analyzes the machining path.

Then, at step 230, it is judged if the machining path is an arc. The program reader/interpreter 44 may also make such a judgment. When it is judged to be an arc, the routine proceeds to step 240, while when it is not judged to be an arc, the routine proceeds to step 270. At step 240, it is judged if the arc-shaped machining path extends across a plurality of zones.

FIG. 6 is another view which shows the divided regions and the feed axis positions. In FIG. 6, the range 0 to X0 of possible movement of the column 16 with respect to the X-axis guide rails 36 is divided equally into the three regions of the zones X1, X2, and X3. Similarly, the range 0 to Y0 of possible movement of the spindle head 18 with respect to the Y-axis guide rails 34 is divided equally into the three regions of the zones Y1, Y2, and Y3.

Furthermore, in FIG. 6, the arc-shaped machining path K4 which extends clockwise from the machining start position P4 and the arc-shaped machining path K5 which extends from the machining start position P5 are shown. As can be seen from FIG. 6, the machining path K4 extends across a plurality of zones, while the machining path K5 extends only at one zone (X-axis direction feed axis zone X3 and Y-axis direction feed axis zone Y3).

Again referring to FIG. 5, when it is judged at step 240 that the arc-shaped machining path extends over a plurality of zones, the parameter selection unit 90 selects control parameters for stick motion correction corresponding to the zone including the center P4' of the machining path K4 (X-axis direction feed axis zone X2 and Y-axis direction feed axis zone Y2). The reason is that when passing through different zones, changing the control parameters is troublesome and time consuming, so setting a single control parameter is advantageous.

Further, when it is not judged that the arc-shaped machining path extends over a plurality of zones, the routine proceeds to step 260. In this case, as in the machining path K5 which is shown in FIG. 6, the machining path extends in only a single zone. At step 260, the parameter selection unit 90 selects the control parameters for stick motion correction corresponding to the zone including that machining path, in this case, the X-axis direction feed axis zone X3 and Y-axis direction feed axis zone Y3.

In this regard, at step 230, when it is not judged that the machining path is an arc, at step 270, it is judged if the machining path extends across a plurality of zones. Further, when the machining path extends across a plurality of zones, the routine proceeds to step 280.

For example, the machining path K3 which is shown in FIG. 3 extends across a plurality of zones (X-axis direction feed axis zone X1 and Y-axis direction feed axis zone Y2 and X-axis direction feed axis zone X2 and Y-axis direction feed axis zone Y2). At step 280, the parameter selection unit 90 sets the control parameters for stick motion correction corresponding to the zone including the machining path the most. In the case of the machining path K3 which is shown in FIG. 3, the control parameters for stick motion correction corresponding to the X-axis direction feed axis zone X2 and Y-axis direction feed axis zone Y2 are set.

On the contrary, when it is judged at step 270 that the machining path does not extend across a plurality of zones, the routine proceeds to step 290. At step 290, the parameter selection unit 90 sets control parameters for stick motion correction of the zone including the machining start position. For example, in the case of the machining path K2 which is shown in FIG. 3, the control parameters for stick motion correction corresponding to the zone including the machining start position P2, that is, the X-axis direction feed axis zone X3 and Y-axis direction feed axis zone Y2, are set.

In this way, in the present invention, the control parameters corresponding to the divided regions which are determined in accordance with the machining path which is analyzed based on the machining program are set. The control parameters are set corresponding to each of the divided plurality of regions. For this reason, in the present invention, it is possible to absorb the differences in rigidity, friction coefficient, etc. of the members of the feed mechanism corresponding to positions of the feed axis and realize stable machining precision without regard as to the feed axis position. Further, various methods of determining which region of control parameters to employ in accordance with the machining path may be considered in addition to the above embodiments. It is also possible to suitably change these in accordance with the workpiece, tool, machining conditions, etc.

Further, in FIG. 6, in addition to the machining start position P4, the movement start position P0 is shown. In actuality, the feed axis is made to quickly move from the movement start position P0 to the machining start position P4. The parameter selection unit 90 preferably selects the control parameters during the fast feed movement and sets the selected control parameters right after reaching the machining start position P4. Due to this, it will be understood that control parameters are set quickly. Further, the control parameters can be determined in advance, so safe control parameters can also be set.

Figure 7B:
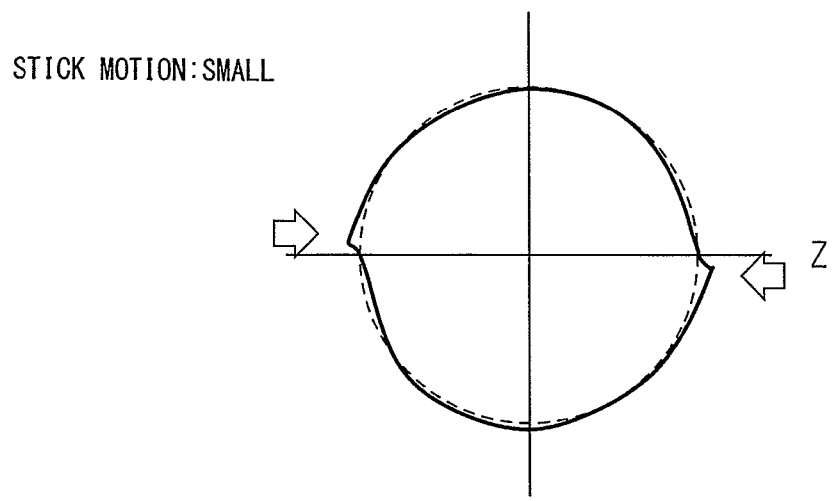
FIG. 7B is a view which shows machining error when cutting a workpiece along an arc-shaped path in a machine tool which is shown in FIG. 7A.

Furthermore, FIG. 7A is a first side view of a machine tool. As shown in FIG. 7A, the screw 14a of the ball screw and the nut 14b which is connected to the table 14 are shown. As is well known, if the motor M is driven, the nut 14b moves along the screw 14a. In FIG. 7A, the nut 14b is present at a position relatively close to the motor M. The rigidity of the screw 14a between the motor M and the nut 14b is large. In such a relationship, if cutting the workpiece along the arc-shaped path, as shown in FIG. 7B, the stick motion becomes relatively small.

Figure 8A:
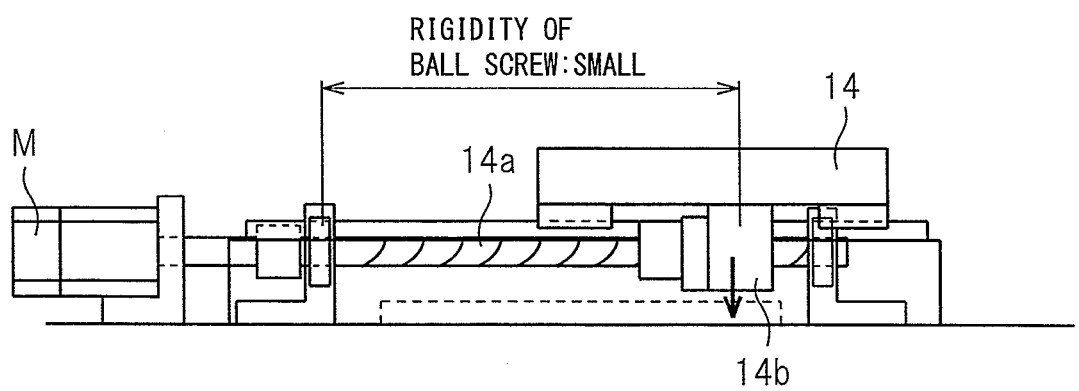
FIG. 8A is a second side view of a machine tool.
Figure 8B:
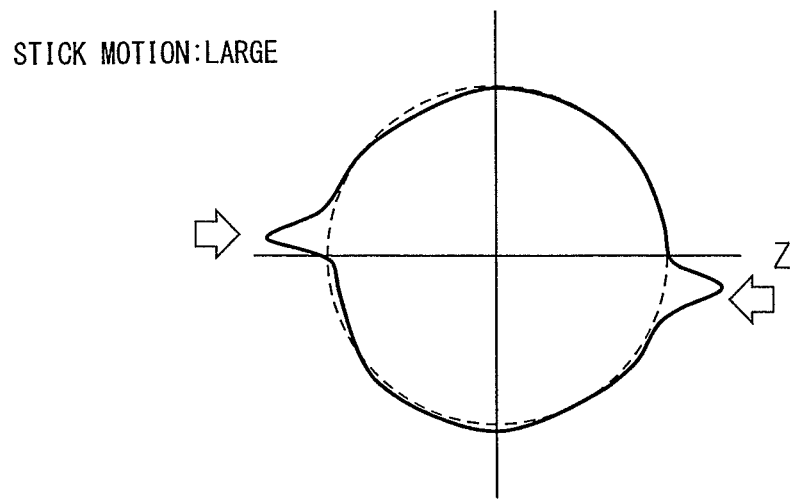
FIG. 8B is a view which shows machining error when cutting a workpiece along an arc-shaped path in a machine tool which is shown in FIG. 8A.

On the contrary, as shown in FIG. 8A, if the nut 14b is present at a relatively far position from the motor M, the rigidity of the screw 14a between the motor M and the nut 14b becomes smaller. Further, in such a relationship, if cutting the workpiece along the arc-shaped path, as shown in FIG. 8B, the stick motion becomes relatively large.

Figure 8C:
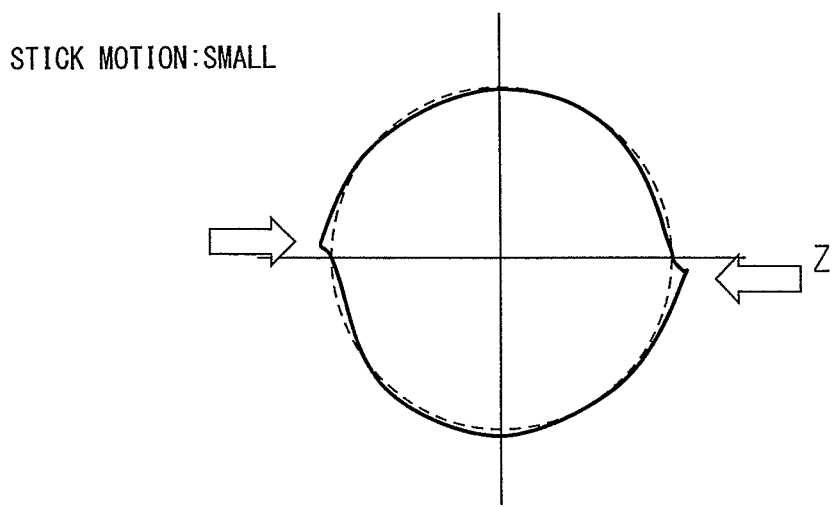
FIG. 8C is a view which shows machining error after correction of stick motion.

In the present invention, based on the NC program 42, the program reader/interpreter 44 analyzes the program and reads the reversal position of the motor M. Further, the control parameters are set as explained above so that torque is added at the reversal position of the motor M (location where stick motion occurs). Further, if using the thus set control parameters for actual machining, as shown in FIG. 8C, stick motion can be reduced. In other words, in the present invention, by setting in advance the control parameters for stick motion correction, it becomes possible to suppress stick motion which occurs at the time of actual machining.

The invention claimed is:

1. A numerical control method which controls a feed axis of a machine tool, which reads and interprets a machining program, issues position commands and speed commands from a distributed control unit to a servo controller, and issues torque commands and current commands to a feed axis motor drive unit on the basis of the position commands and speed commands, said numerical control method of a machine tool comprising steps of:

dividing a range of movement of the feed axis into a plurality of regions and storing in advance a plurality of control parameters corresponding to said divided plurality of regions and used by the servo controller, analyzing a machining path from the machining program of said machine tool, reading out control parameters corresponding to a region selected from the divided plurality of regions, determined in accordance with said machining path from said stored plurality of control parameters, the selected region being a region in which the analyzed machine path is the longest, a region in which a center of an arc shape of the analyzed machine path is located, or a region in which a machining start point of the analyzed machine path is located, and servo controlling the torque commands and current commands to be sent to the feed axis motor drive unit using the read-out control parameters while the read-out control parameters are inputted to the servo controller.

2. The numerical control method of a machine tool as set forth in claim 1, wherein said control parameters are read out while the feed axis is moving toward a machining start position and are set to said control parameters immediately after reaching said machining start position.

3. The numerical control method of a machine tool as set forth in claim 1, wherein said control parameters include at least one of an acceleration/deceleration time constant, feedback gain, feed forward gain, stick motion correction parameters, and filter constant of said feed axis.

4. A numerical control device which reads and interprets a machining program, issues position commands and speed commands from a distributed control unit to a servo controller, and issues torque commands and current commands to a feed axis motor drive unit on the basis of the position commands and speed commands so as to control a feed axis of a machine tool, comprising:

a storage unit which divides a range of movement of the feed axis into a plurality of regions and stores a plurality of control parameters corresponding to said divided plurality of regions and used by the servo controller, an analysis unit which analyzes a machining path from the machining program of said machine tool, a parameter selection unit which reads out control parameters corresponding to a region selected from the divided plurality of regions, determined in accordance with said machining path from said stored plurality of control parameters, the selected region being a region in which the analyzed machine path is the longest, a region in which a center of an arc shape of the analyzed path is located, or a region in which a machining start point of the analyzed path is located, and a servo control unit which receives the read-out control parameters and servo controls the torque commands and current commands to be sent to the feed axis motor drive unit using the read-out control parameters.

* * * * *